US00RE44523E

(19) United States
(12) Reissued Patent
Scott-Thomas

(10) Patent Number: US RE44,523 E
(45) Date of Reissued Patent: Oct. 8, 2013

(54) IMAGING DEVICE WITH PRE-CHARGED SIGNAL LINE

(75) Inventor: John Scott-Thomas, Ottawa (CA)

(73) Assignee: Harusaki Technologies, LLC, Wilmington, DE (US)

(21) Appl. No.: 12/057,798

(22) Filed: Mar. 28, 2008

Related U.S. Patent Documents

Reissue of:
(64) Patent No.: 7,019,277
Issued: Mar. 28, 2006
Appl. No.: 10/387,884
Filed: Mar. 13, 2003

(51) Int. Cl.
*H01J 40/14* (2006.01)

(52) U.S. Cl.
USPC ..... 250/214 R; 250/208.1; 348/310

(58) Field of Classification Search
USPC ..... 250/214 R, 208.1, 214.1; 348/308, 348/310, 297, 302
See application file for complete search history.

(56) References Cited

U.S. PATENT DOCUMENTS

| | | | | |
|---|---|---|---|---|
| 5,122,881 | A * | 6/1992 | Nishizawa et al. | 348/301 |
| 5,434,620 | A * | 7/1995 | Higuchi et al. | 348/308 |
| 6,133,862 | A | 10/2000 | Dhuse et al. | 341/118 |
| 6,163,363 | A | 12/2000 | Nelson et al. | 355/32 |
| 6,169,505 | B1 | 1/2001 | Nishimura et al. | 341/141 |
| 6,175,383 | B1 * | 1/2001 | Yadid-Pecht et al. | 348/302 |
| 6,252,217 | B1 * | 6/2001 | Pyyhtia et al. | 250/208.1 |
| 6,414,297 | B1 * | 7/2002 | Sasaki et al. | 250/214 R |
| 6,459,077 | B1 * | 10/2002 | Hynecek | 250/208.1 |
| 6,493,030 | B1 | 12/2002 | Kozlowski et al. | |
| 6,734,413 | B2 * | 5/2004 | Dai | 250/208.1 |
| 6,794,627 | B2 * | 9/2004 | Lyon et al. | 250/208.1 |
| 7,221,397 | B1 * | 5/2007 | Kochi | 348/310 |
| 2002/0005563 | A1 * | 1/2002 | Shu | 257/529 |
| 2003/0011694 | A1 * | 1/2003 | Dierickx | 348/308 |
| 2004/0036643 | A1 * | 2/2004 | Bock | 341/155 |
| 2004/0036788 | A1 * | 2/2004 | Chapman et al. | 348/308 |
| 2004/0096124 | A1 * | 5/2004 | Nakamura | 382/308 |
| 2011/0128254 | A1 * | 6/2011 | Teranishi et al. | 345/174 |

FOREIGN PATENT DOCUMENTS

JP 08248388 A * 9/1996

* cited by examiner

*Primary Examiner* — Thanh Luu
(74) *Attorney, Agent, or Firm* — McAndrews, Held & Malloy, Ltd.

(57) ABSTRACT

The invention is directed to an imaging device and a method of operating the imaging device, which will reduce banding in the image caused by parasitic capacitance. The imaging device comprises an array of pixels arranged in rows and columns and column signal lines adapted to be selectively coupled to the rows of pixels at predetermined times. Each pixel element has a photodetector coupled to a reset switch for receiving a reset signal to reset the photodetector. The imaging device further includes a precharge circuit adapted to place a voltage on the column signal lines. The method of operating the imaging device includes the steps of applying a precharge voltage to the signal lines, resetting the photodetectors in a row, integrating the photodetector voltage as light impinges on the reset photodetectors, coupling the integrated photodetectors to the signal lines, and sampling the integrated voltage coupled to each of the signal lines. When the double sampling technique is used, the steps further include resetting the photodetectors and sampling the photodetector reset voltages on the signal lines. The precharge voltage is applied to signal lines during the integration period of the photodetectors and is disconnected from a signal line during sampling.

40 Claims, 8 Drawing Sheets

IMAGING DEVICE WITH PRE-CHARGED SIGNAL LINE

Matter enclosed in heavy brackets [ ] appears in the original patent but forms no part of this reissue specification; matter printed in italics indicates the additions made by reissue.

FIELD OF THE INVENTION

The present invention relates to the field of imaging devices, and more specifically to the architecture of the pixel sampling circuitry column signal lines.

BACKGROUND OF THE INVENTION

Over the past decade, there have been great developments in the field of image sensors, the commercialization of these products have led to increasing amount of consumer and industrial products that have revolutionized the areas of inventory, security, and photography in general. However, there are still problems with the quality of image sensors, and it is the development of solutions for these problems that will allow it to continue to rise in use and application.

One problem that has plagued image sensors is a concept known as "banding", in particular one type of banding is known as the "first frame effect". "Banding" occurs during an image capture, and results in a line or "band" of darker pixels appearing in the captured image. This problem can largely be attributed to the parasitic capacitance between the imaging pixel cell and the column signal line, and noise in the power source for the reset voltage, these types of noise are commonly referred to as "reset noise".

The issue of banding has been dealt with before with some success through the use of a variation on double sampling, in combination with a memory device.

During a normal double sample, which is designed to reduce fixed pattern noise, the pixel is reset, allowed to integrate and then sampled at a sample time. Shortly thereafter, the pixel is reset again and sampled once again so that a second reset voltage for that pixel can be captured. The processing circuitry then compares the captured second reset voltage and the captured sample voltage, in order to determine an actual sample voltage free of the fixed pixel noise.

There is a variation on this technique in the prior art, which allows the imager to reduce "reset noise" as well as the fixed pixel noise. The double sample is performed in the normal manner, however there is a memory device attached to the row, which captures the first reset voltage. This first reset voltage can then be used to determine the noise between the first and second reset voltage, and that information can be used by the imaging process circuitry in order to remove that noise from the actual sample voltage.

In order to accommodate this method of reducing the "reset noise" a memory device must be added to imager. This type of solution focuses on the issue of noise in the voltage supply, but does not address in particular the issue of noise due to parasitic capacitance between the column signal line and the imaging cell.

The "banding" that results from parasitic capacitance, is typically referred to as the "first frame effect". This type of banding creates a dark line of pixels from the first row that has been reset after the first sample signal has been placed on the column line. This distortion of pixel intensity makes the first frame of the imager unserviceable. In prior art systems this frame has simply been discarded with only the subsequent images being used for the purpose of imaging.

It may be considered that this is an inappropriate solution, as this adds time to the image capture cycle for the imager. Additionally it may be considered that this will lead to problems in some image capture systems, whereby a sequence of frames is being captured, and the first frame is needed in order to accomplish the task for the imager. For example, in a package transportation belt with a stationary mounted imager for decoding bar-codes, the belt speed may prevent a package from being properly scanned. Other examples would be apparent to one skilled in the art that the first frame should not be discarded.

It is to be noted that although a specific imaging architecture has been discussed to illustrate the deficiencies in the prior art, other imaging architectures could contain the same deficiencies. Thus, the problem discussed could occur in other circuits that use a similar technique for pixel readout.

Therefore, there is a need for a method and apparatus for improving image quality from an electronic image by reducing banding resulting from parasitic capacitance between the imaging pixel and the column signal line.

SUMMARY OF THE INVENTION

The invention is directed to a method of operating an imaging device having a number of pixels and one or more signal lines, wherein each pixel has a photodetector. The method comprises the steps of applying a precharge voltage to the signal line, resetting the photodetector, integrating the photodetector voltage as light impinges upon it, coupling the photodetector to the signal line, and sampling the integrated voltage coupled to the signal line.

In accordance with another aspect, the invention is directed to a method of operating an imaging device having an array of pixels arranged in rows and columns and a signal line for each column, wherein each pixel has a photodetector. The method comprises the steps of applying a precharge voltage to the signal lines, resetting the photodetectors in a row, integrating the photodetector voltage as light impinges on the reset photodetectors, coupling the integrated photodetectors to the signal lines, and sampling the integrated voltage coupled to each of the signal lines. The above steps are repeated for each of the rows of pixels.

In accordance with a further aspect of the invention, the method includes the steps of resetting the photodetector and sampling the photodetector reset voltage on the signal line.

In accordance with another aspect of the invention, the precharge voltage is applied to the signal line during the integration time of the photodetector.

In accordance with another aspect, the invention is directed to an imaging device comprising a pixel element having a photodetector coupled to a reset switch, said reset switch being adapted to receive a reset signal, a signal line adapted to be selectively coupled to said pixel element and a precharge circuit selectively coupled to said signal line to provide precharge voltage to said signal line.

In accordance with yet another aspect of the invention, the imaging device comprises an array of pixels arranged in rows and columns, column signal lines adapted to be selectively coupled to the rows of pixels at predetermined times, and a precharge circuit adapted to place a voltage on the column signal lines.

In accordance with a specific aspect of this invention, the precharge circuit includes a switch arrangement for connecting the signal line or lines to a precharge voltage supply. The switch arrangement can be a switch for each of the signal lines, a switch for all of the signal lines or a number of switches, each connected to a selected group of signal lines.

In accordance with a further aspect of the invention, the precharge circuit includes a controller for closing the switch or switches when a pixel element is not coupled to the signal line. The controller further includes a detector for sensing the voltage on the signal lines.

In accordance with yet another aspect, the invention is directed to an apparatus for placing a voltage on signal lines of an imaging device, wherein the signal lines are adapted to be selectively coupled to columns of pixels at predetermined times. The apparatus comprises a switch arrangement adapted to connect a voltage supply to the signal lines, and a controller for controlling the switch arrangement to connect the voltage supply means to the signal lines at times other then the predetermined times. The switch arrangement can be a switch for each of the signal lines, a switch for all of the signal lines or a number of switches, each connected to a selected group of signal lines.

In accordance with a specific aspect of the invention, the controller closes the switch when a pixel is not coupled to the signal line and includes a detector for detecting voltage on the signal lines.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

Figure 1:
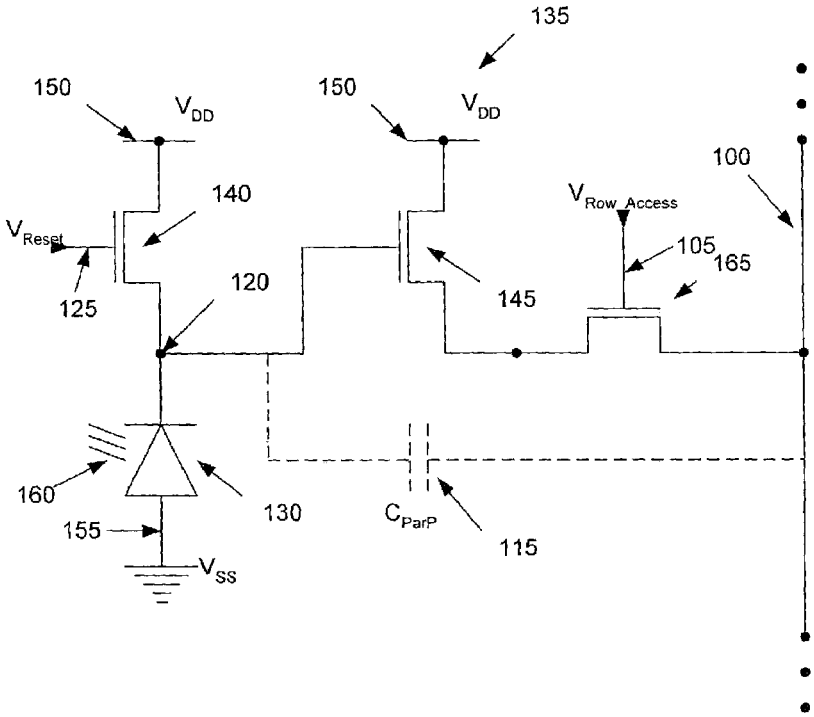
FIGURE 1 (Prior Art)
FIG. 1 illustrates a prior art pixel circuit diagram showing the location of the parasitic capacitance that may occur between a CMOS imaging pixel, and the column signal line.

The present invention provides a method and apparatus for substantially reducing the impact of the first frame effect on electronic imaging devices. For purposes of explanation, specific embodiments are set forth to provide a thorough understanding of the present invention. However, it is to be understood from the present disclosure, that although the present invention is described using CMOS image sensors, most, if not all, aspects of the invention apply to image sensors in general. Moreover, well-known elements, devices, process steps and the like are not set forth in order to provide a clear and simple description of the present invention.

Operation of the various embodiments of the invention will be explained using an NMOS implementation of the circuits. The following abbreviations are used in this disclosure to describe the various operating regions of the FET. A FET is said to be "turned off" when $V_{GS}$ (gate-source voltage)$<V_T$ (threshold voltage) for the device and the device is operating in the cut-off region where its channel acts as an open circuit. When a FET is "turned on" ($V_{GS} \geq V_T$) and $V_{DS}$ (drain-source voltage)$\leq V_{GS}-V_T$, the device is operating in the triode region.

Furthermore, logic signals are denoted as being "high" or "low", this, as is known to one skilled in the art, refers to the first supply voltage of the device, (such as 3.3 V or 5 V) and the second supply voltage of the device, (typically ground). However, the reverse could also be used if the implementation were to use PMOS circuits, or inverters in combination with NMOS circuitry.

Additionally, the terms "active high" and "active low" refer to electronic devices that become turned on, either through the use of a high signal or a low signal, respectively.

The present invention will be described in conjunction with a typical pixel element 135 illustrated in FIG. 1. However, it will become evident to those skilled in the art that the present invention can be equally applied to numerous other pixel types. Pixel 135 consists of a photodiode element 130, whose cathode is coupled at node 120 to both the source of a reset transistor 140 and to the gate of a source-follower transistor 145. The reset transistor 140 has a gate activated by a signal $V_{Reset}$ applied to line 125, and it is coupled at its drain to a first supply voltage $V_{DD}$ on line 150. The anode of the photodiode 130 is coupled to a second supply voltage $V_{SS}$ on line 155. The source-follower transistor 145 is coupled at its drain to the first supply voltage $V_{DD}$ on line 150, and at its source to the drain of the row access transistor 165. The row access transistor 165 has a gate activated by a signal $V_{Row_Access}$ on line 105, and is coupled at its source to the column signal line 100. This type of pixel 135 has a parasitic capacitance ($C_{ParP}$), which is shown as element 115 and will be described below.

Pixel 135 operates as follows. Reset transistor 140 is turned on by the $V_{Reset}$ signal pulse on line 125 at time $t_1$. The first voltage supply $V_{DD}$ on line 150 then places a charge, which is approximately equal to the reset voltage $V_{Reset}$ on line 125 subtracting the threshold voltage of the reset transistor 140 ($\sim V_{Reset}-V_T$), on the photodiode 130 cathode coupled to node 120. This voltage remains floating at the pixel node 120 but is "leaked" slowly by the photodiode 130 to the second voltage supply on line 155. The rate of leakage depends on the amount of light 160 impinging on the photodiode 130; the greater the light intensity that strikes the surface of the photodiode 130 the faster the charge is leaked through to the second voltage supply on line 155. This charge is allowed to "leak" for a period of time, commonly known as the integration time $T_{INT}$, essentially the time between the resetting of the pixel 135 and the sampling of the pixel 135. When the pixel 135 is to be sampled, a $V_{Row_Access}$ signal pulse on line 105 is applied to the gate of transistor 165, which turns on the row access transistor 165. The charge on the pixel node 120 is also present on the gate of the source-follower transistor 145 and controls the application of voltage $V_{DD}$ from the first voltage supply on line 150 to the row access transistor 165. As the row access transistor 165 is now active, a voltage is passed to the column signal line 100 that is approximately equal to the voltage at the pixel node 120 minus the threshold voltages ($V_T$) of both the source-follower transistor 145 and the row access transistor 165. At this point the signal can be sent to the processing circuitry coupled to column signal line 100 and the pixel 135, is considered to have been sampled or read.

Figure 2:
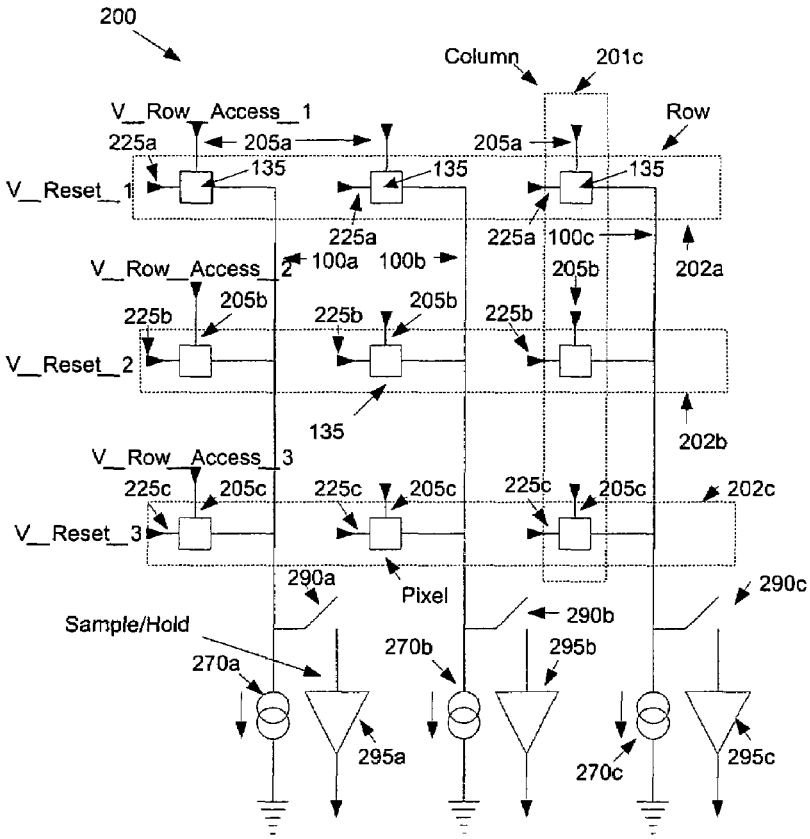
FIGURE 2 (PRIOR ART)
FIG. 2 illustrates a prior art imaging device circuit diagram.

In a CMOS imaging device 200, an imaging array usually consists of several rows and columns of pixel elements 135, organized in a (m×n) matrix fashion. Typically the number of rows is denoted as m, and the number of columns is denoted as n. Each column line 100a, 100b, 100c . . . is connected to a pixel 135 in each row, typically in a manner as is shown in FIG. 2, which illustrates, in block diagram form, a 3×3 matrix. Typically an actual imaging device 200 consists of much larger arrays, however the array 200 illustrated is only meant as an example to simplify the explanation of the present invention.

Figure 3:
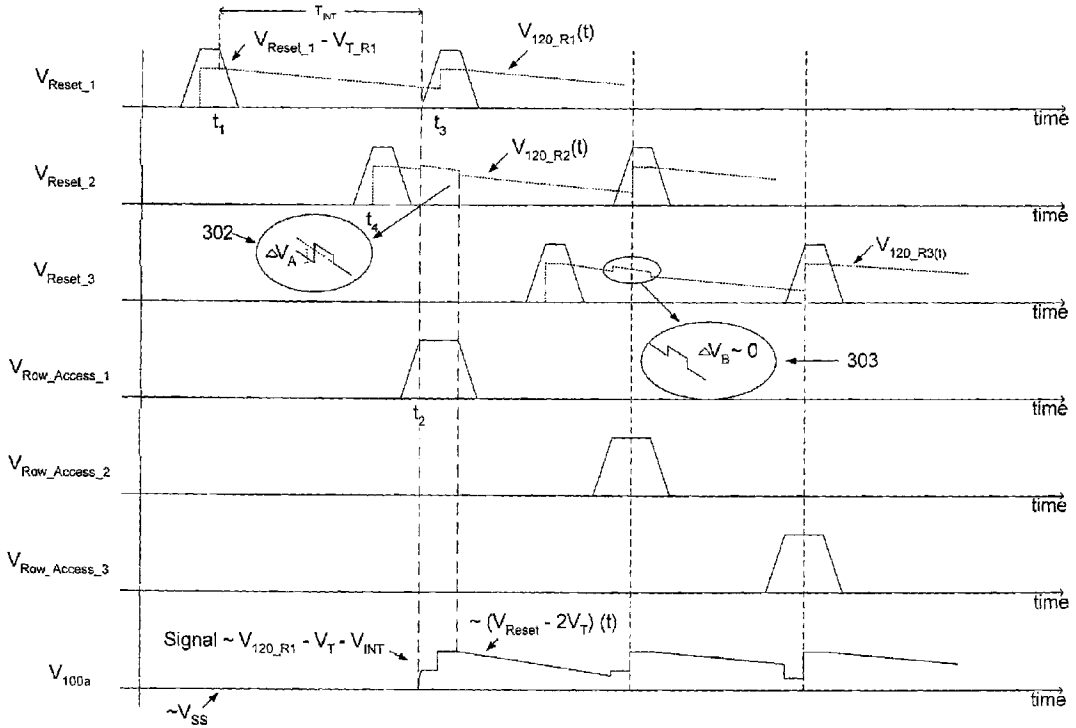
FIGURE 3 (Prior Art)
FIG. 3 shows a timing diagram for the imaging device in FIG. 2.

The "banding" or "first frame effect" is illustrated as follows. In a typical video operation mode of the array, the first row 202a of the array is reset by $V_{Reset_1}$, a pulse on line 225a followed by the resetting of the second row 202b, the third row 202c and so on. Referring to FIG. 3, the voltage on the pixel nodes for the first row 202a is raised to the voltage level approximately equivalent to the following formula at time $t_1$:

$$V_{120_R1}(t_1)=(V_{Reset_1}-V_{T_R1}).$$

At this point, the voltage $V_{100a}$ on the column line 100a is undefined. For this example it can be assumed that it is at ground, namely $V_{SS}$. Therefore, the parasitic capacitor 115 will have a charge equivalent to the following formula placed on it:

$$Q_{ParP}=C_{ParP}*(V_{Reset_1}-V_T-V_{SS}).$$

Later, in turn, the second row of pixels 135 will be reset at time $t_4$, the third row at time $t_5$, and so on.

With reference to FIGS. 1 and 2, after the first row was reset and an amount of time, known as the integration time ($T_{INT}$), has passed, the $V_{Row_Access}$ signal pulse is applied on line 205a at time $t_2$, and the voltage on the pixel 135 is applied to line 100a as $V_{100a}$ ($t_2$) to be sampled by the sampling circuit 295a. The current sources 270a, 270b, 270c . . . are part of the read-out circuit and may be switched current sources which are accessed during the read-out cycle to pull down the voltage across the diode 130 of each pixel 135.

$$V_{100a}(t_2)=(V_{Reset_1}-2V_T-V_{INT}),$$

where $V_{INT}$ is the voltage decay or leakage from the diode 130 during the integration period ($T_{INT}$).

The pixels 135 of the first row 202a are then reset to their initial values at time $t_3$ and sampled again, this is known as double sampling. After this, the column line 100a is at a voltage $V_{100a}(t_3)$ approximately equal to the following formula:

$$V_{100a}(t_3)\sim Y_{Reset_1}-2V_T.$$

The effect of this on the other rows that are integrating, for example, as is shown as event 302 in FIG. 3, is to "pump" the diodes 135. Since the column 100a is coupled to the second row 202b, the diode voltage $V_{120b}$ will be raised by:

$$\Delta V_A\sim(V_{Reset_1}-2V_T)C_{ParP}/(C_{ParP}+C_{ParTot})$$

The voltage $V_{100a}(t_3)$ on line 100a decays slowly until the read/reset cycle for the next row, however its value generally remains well above $V_{100a}(t_2)$. Therefore a row 202b, 202c, . . . that is reset after the columns 100a, 100b, 100c . . . have been raised from their initial value of $V_{SS}$ in this example to about ($V_{SS}$−2 $V_T$) will have negligible charge pump effect. This situation is shown in FIG. 3, as $\Delta V_B$ during event 303. This is the source of the "first frame" effect.

It has been determined that holding the column lines 100a, 100b, 100c . . . at a substantially constant voltage when the rows are being reset can significantly reduce the first frame effect. In this way, charge pumping can be reduced. Further, it has been determined that the presence of a voltage level on the column lines 100a, 100b, 100c . . . prior to the pixels 135 being sampled substantially reduces the impact of the column to pixel charge pumping.

Figure 4:
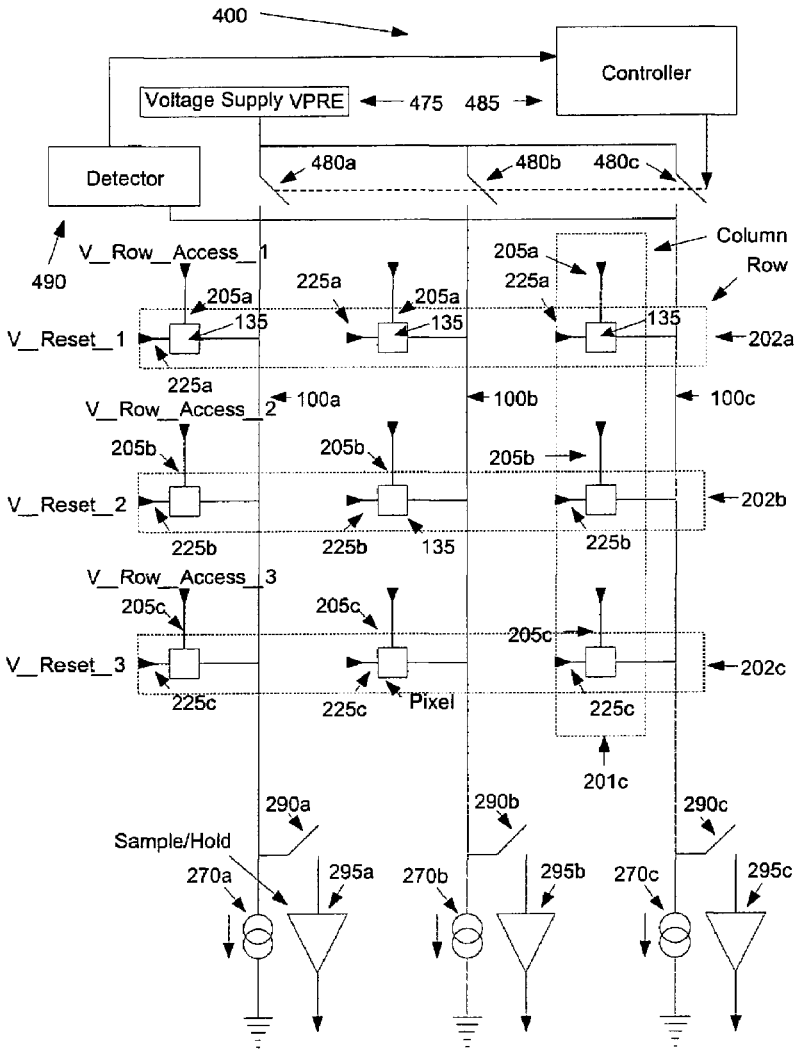
FIG. 4 illustrates an embodiment of an imaging device circuit diagram in accordance with the present invention.

The method of reducing banding in accordance with the present invention comprises applying a voltage to the column lines 100a, 100b, 100c . . . in an imaging device 200 while the rows of pixels 135 are being reset and the sampling circuits 295 are not sampling the voltages on the pixel 135 diodes 130. FIGS. 4, 6, 7 and 8 illustrate the imaging devices 400, 600, 700 and 800 which include apparatus for accomplishing the method. For clarity and to simplify the description, elements of the imaging devices 400, 600, 700 and 800 which are similar to those of the imaging device 200 in FIG. 2, carry the same reference numbers. This also applies to the timing diagram illustrated in FIG. 5. In FIG. 4, the apparatus comprises a voltage supply circuit 475, which is connected to the column lines 100a, 100b, 100c . . . through switches 480a, 480b, 480c . . . , such that the voltage supply circuit 475 is selectively coupled to the column lines 100a, 100b, 100c . . . .

Figure 5:
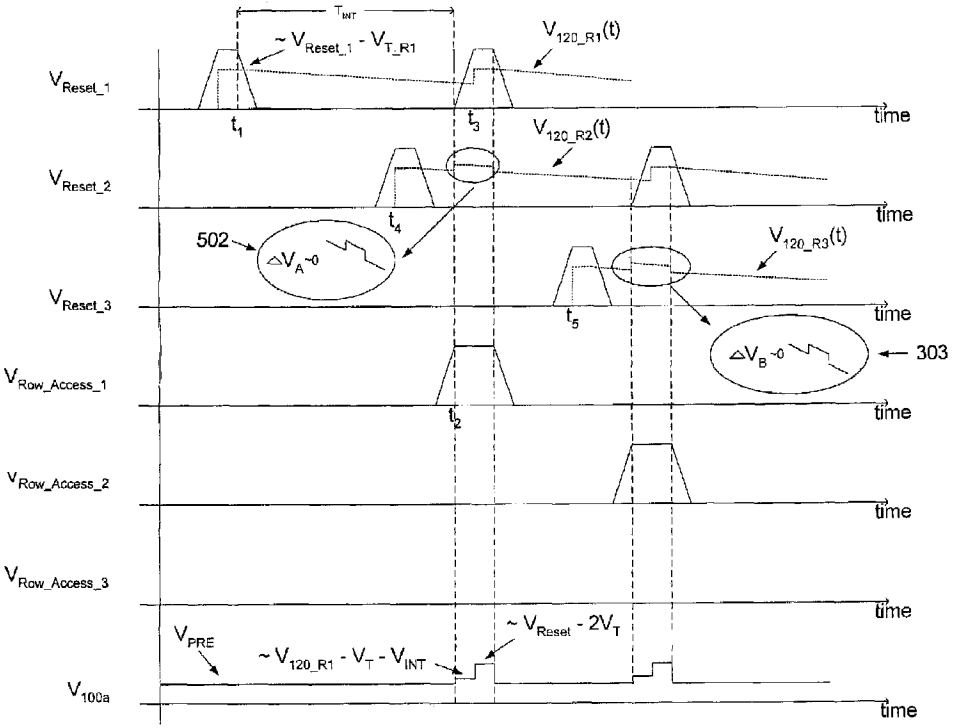
FIG. 5 shows a timing diagram for the imaging device in FIG. 4.

The voltage supply circuit 475, also referred to as the precharge circuit, is selected to provide a reasonably constant voltage $V_{PRE}$ to precharge the column line or lines 100a, 100b, 100c . . . , prior to pixel sampling as shown in FIG. 5. The precharge voltage $V_{PRE}$ that the supply circuit 475 provides for different imaging devices may vary depending on a number of factors; the main ones being the voltage of the voltage supply 150 of the imaging device 400 itself and the level of parasitic capacitance $C_{ParP}$ associated with the design of the imaging device 400. The actual precharge voltage $V_{PRE}$, which would normally always be less then the imaging device 400 voltage supply 150 voltage, can be readily determined by one skilled in the art. It has been found that typically for a 3.3 V imaging device 400 power supply 150 voltage $V_{DD}$, an approximately 2.0 V precharge voltage $V_{PRE}$ is sufficient.

As a result of the application of the voltage $V_{PRE}$ to the line 100a, $\Delta V_A$, shown in FIG. 5 as event 502, is much reduced and is now is very similar to the voltage shift $\Delta V_B$ shown as event 303. This reduces the banding effect, which occurs in the first frame.

Figure 6:
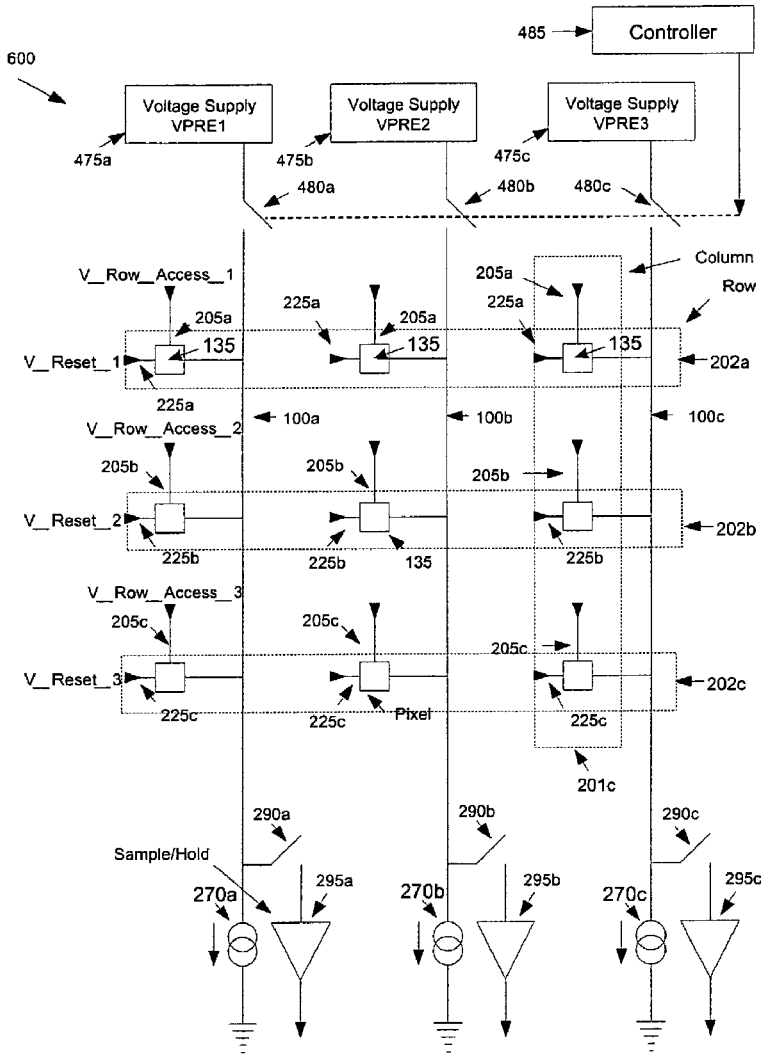
FIG. 6 illustrates an embodiment of an image device circuit diagram in accordance with the present invention having a separate voltage supply circuit for each column.

The present invention may be implemented by providing a separate voltage supply circuit 475a, 475b, 475c . . . for each column 100a, 100b, 100c . . . as shown in FIG. 6. Each column 100a, 100b, 100c . . . will have a switch 480a, 480b, 480c . . . for selectively coupling it, under the control of a controller 485, to the voltage supply circuit 475a, 475b, 475c . . . , when its respective column sample circuit 295a, 295b, 295c . . . is not connected through its switch 290a, 290b, 290c . . . to the respective column line 100a, 100b, 100c . . . .

Figure 8:
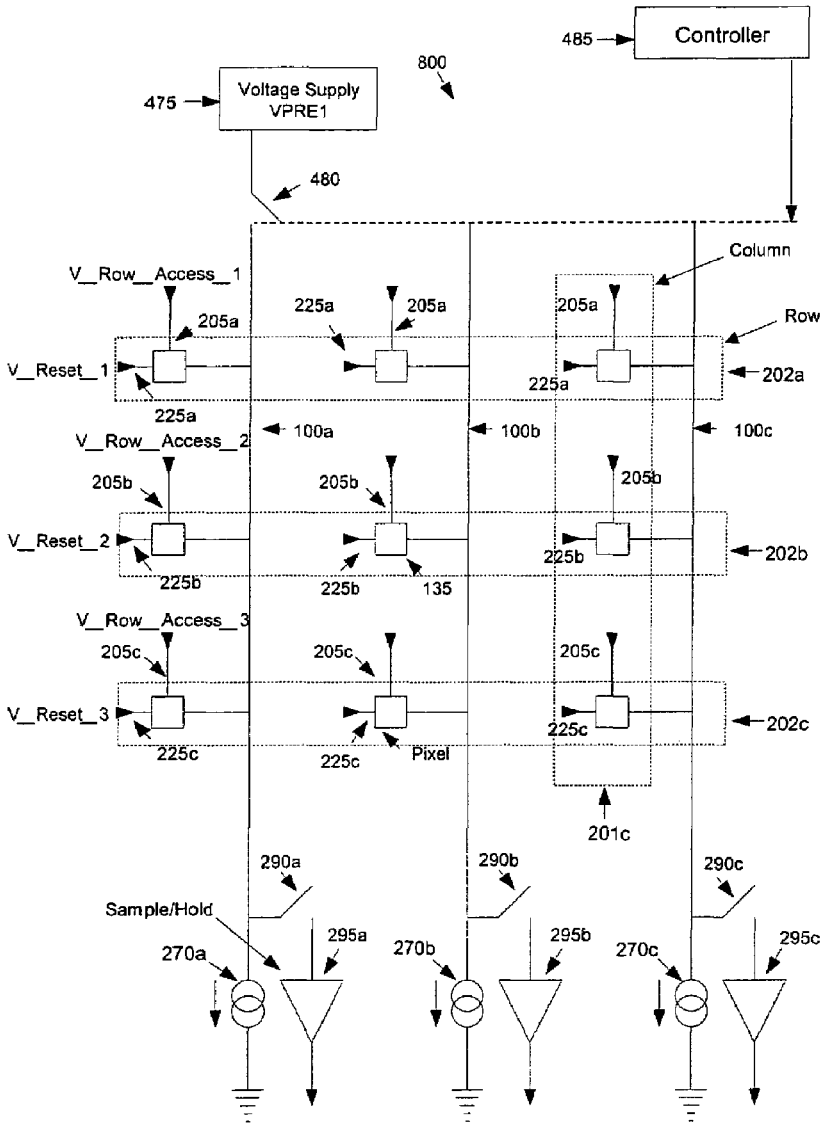
FIG. 8 illustrates an embodiment of an image device circuit diagram in accordance with the present invention having a voltage supply circuit with a single switch for all columns.

In the embodiments shown in FIGS. 4 and 8, only one precharge circuit 475 is used for the entire array of pixels 135. In FIG. 4, the precharge circuit 475 is selectively coupled to each column line 100a, 100b, 100c . . . through a respective switch 480a, 480b, 480c . . . controlled by controller 485 for each column 100a, 100b, 100c . . . in the imaging device 400. The precharge switch 480a, 480b, 480c . . . would be opened, as the array 200 was about to be read when the coupling switch 290 connects the sampling circuit 295a, 295b, 295c . . . to switch on and read the voltage on the respective column line 100a, 100b, 100c . . . . Alternatively, as shown in FIG. 8, the precharge circuit 475 is coupled to all of the columns 100a, 100b, 100c . . . through a switch 480 controlled by controller 485 for all of the columns 100a, 100b, 100c . . . for the array 800.

Figure 7:
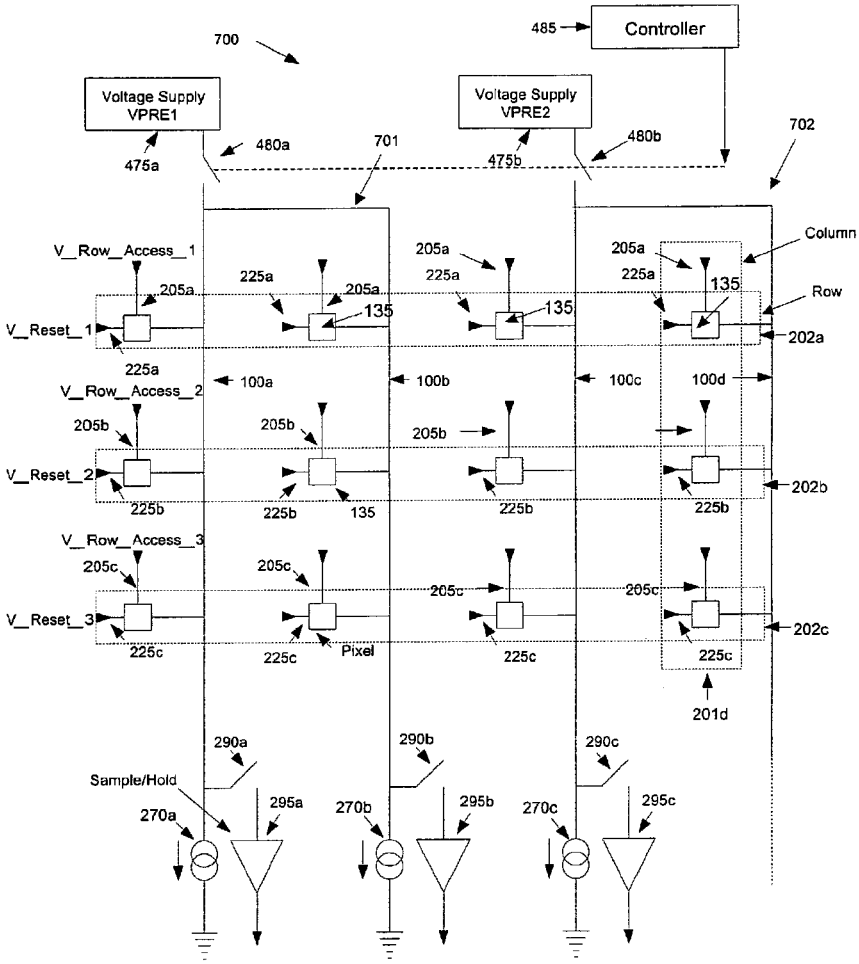
FIG. 7 illustrates an embodiment of an image device circuit diagram in accordance with the present invention having a separate voltage supply circuit for preselected blocks of columns.

Another embodiment of the present invention is shown in FIG. 7. The imaging device 700 uses separate precharge circuits 475 475a, 475b, . . . for precharging pre-selected blocks of columns 100a, 100b, 100c . . . in the array 200. In this particular embodiment, though preselected blocks 701, 701, . . . are shown to include pairs of column 102a with 102b, 102c with 102d, . . . other arrangements are within the scope of the present invention. Each precharge circuit 475a, 475b, . . . would be selectively coupled to a respective block 701, 702, . . . through a switch 480a, 480b , . . . when the preselected columns 100a, 100b, 100c . . . in the blocks 701, 702, . . . are not being sampled.

The precharging system may also be implemented by inserting of a voltage level detection circuit 490 on each of the column signal lines 100a, 100b, 100c . . . as shown in FIG. 4. Upon the detection of a voltage level on a signal line 100a, 100b, 100c . . . that is far below a level where useful pixel data would exist, the column line 100a, 100b, 100c . . . in question would be clamped to a precharge circuit 475 through a switching device 480a, 480b, 480c . . . under the control of the controller 485. This would minimize power use by not applying a precharge voltage when it is not required and at the same time allow the column signal line 100a, 100b, 100c . . . to retain at least a minimal precharge voltage.

While the invention has been described according to what is presently considered to be the most practical and preferred embodiments, it must be understood that the invention is not limited to the disclosed embodiments. Those ordinarily skilled in the art will understand that various modifications and equivalent structures and functions may be to made without departing from the spirit and scope of the invention as defined in the claims. Therefore, the invention as defined in the claims must be accorded the broadest possible interpretation so as to encompass all such modifications and equivalent structures and functions.

What is claimed is:

1. A method of operating an imaging device having a number of pixels and one or more signal lines, wherein each pixel has a photodetector, comprising the steps of:

resetting the photodetector;

integrating the photodetector voltage as light impinges on the photodetector;

sampling the photodetector by passing the integrated photodetector voltage to the signal line; and applying a precharge voltage to the signal line prior to the resetting of the photodetector.

2. A method as claimed in claim 1 further comprising the steps of:

resetting the photodetector; *and* sampling the photodetector reset voltage on the signal line.

3. A method as claimed in claim 1 wherein the precharge voltage is applied to the signal line during the entire reset and integration time of the photodetector.

4. A method of operating an imaging device having an array of pixels arranged in rows and columns and a signal line for each column, wherein each pixel has a photodetector, comprising the steps of:

resetting the photodetectors in a row;

integrating the photodetector voltage as light impinges on the reset photodetectors;

sampling the photodetectors by passing the integrated photodetector voltages to each of the signal lines; and applying a precharge voltage to the signal lines prior to the resetting of the photodetectors.

5. A method as claimed in claim 4 wherein the steps of claim 4 are repeated for each of the rows of pixels.

6. A method as claimed in claim 4 further comprising the steps of:

resetting the photodetectors in the row; *and* sampling the photodetector reset voltage coupled to each of the signal lines.

7. A method as claimed in claim 6 wherein the steps of claim 6 are repeated for each of the rows of pixels.

8. A method as claimed in claim 4 wherein the precharge voltage is applied to the signal lines during the entire reset and integration time of the photodetectors.

9. An imaging device comprising:

a pixel element adapted to have a reset, integration and sampling operating cycle, said pixel element having a photodetector coupled to a reset switch, said reset switch being adapted to receive a reset signal and to apply a reset voltage to the photodetector;

a signal line adapted to be selectively accessed by said pixel element to be sampled; and a precharge circuit selectively coupled to said signal line to provide a precharge voltage to said signal line prior to the application of the reset voltage to the photodetector.

10. An imaging device as claimed in claim 9 wherein the precharge circuit includes switch means adapted to be connected to a precharge voltage supply and means for connecting the switch means to the signal line.

11. An imaging device as claimed in claim [9] *10* wherein the precharge circuit includes control means for maintaining the switch means closed when the pixel element is not accessing the signal line.

12. An imaging device as claimed in claim 11 wherein the control means includes means for detecting voltage on the signal line.

13. An imaging device comprising:

an array of pixels arranged in rows and columns and adapted to have a reset, integration and sampling operating cycle;

column signal lines adapted to be selectively accessed by the rows of pixels to be sampled; and a precharge circuit adapted to place a voltage on the column signal lines prior to the resetting of each row of pixels.

14. An imaging device as claimed in claim 13 wherein the precharge circuit includes switch means adapted to be connected to a precharge voltage supply and to the signal line.

15. An imaging device as claimed in claim 14 wherein the switch means includes a switch for each of the signal lines.

16. An imaging device as claimed in claim 15 wherein each switch is adapted to be connected to an independent precharge power supply.

17. An imaging device as claimed in claim 14 wherein the switch means includes a switch for all of the signal lines.

18. An imaging device as claimed in claim 14 wherein the precharge circuit includes control means for closing the switch means when a pixel element is not coupled to the signal line.

19. An imaging device as claimed in claim 18 wherein the control means includes means for detecting voltage on the signal lines.

20. An imaging device as claimed in claim 14 wherein the switch means includes a number of switches, each switch connected to a selected group of signal lines.

21. An apparatus for placing a voltage on signal lines of an imaging device having an array of pixels arranged in rows and columns wherein the rows of pixels have a reset, integration and sampling operating cycle and the signal lines are adapted to be selectively accessed by columns of pixels during sampling, the apparatus comprising:

switch means adapted to be connected to a voltage supply for connection to the signal lines; and means for controlling the switch means to connect the voltage supply means to the signal lines prior to pixel reset.

22. An apparatus as claimed in claim 21 wherein the switch means includes a switch for each of the signal lines.

23. An apparatus as claimed in claim 22 wherein each switch is adapted to be connected to an independent precharge power supply.

24. An apparatus as claimed in claim 21 wherein the switch means includes a switch for all of the signal lines.

25. An imaging device as claimed in claim 21 wherein the control means closes the switch means when a pixel is not accessing the signal line.

26. An imaging device as claimed in claim 25 wherein the control means includes means for detecting voltage on the signal lines.

27. An apparatus as claimed in claim 21 wherein the switch means includes a number of switches, each switch connected to a selected group of signal lines.

*28. A method of operating an imaging device having a plurality of pixels and one or more signal lines, wherein each pixel from the plurality of pixels has a photodetector, the method comprising:*

*resetting a photodetector of a pixel from the plurality of pixels; and*

*applying a precharge voltage to a signal line coupled to the plurality of pixels prior to the resetting of the photodetector.*

*29. The method of claim 28, further comprising integrating a voltage of the photodetector as light impinges on the photodetector.*

*30. The method of claims 29, further comprising sampling the photodetector by passing a voltage to the signal line that is indicative of the integrated voltage of the photodetector.*

*31. A method of operating an imaging device having an array of pixels arranged in rows and columns and a signal line for each column, wherein each pixel has a photodetector, comprising:*

*resetting the photodetectors in a row; and*

*applying a precharge voltage to the signal lines prior to the resetting of the photodetectors.*

*32. The method of claim 31, further comprising integrating a voltage of the photodetector as light impinges on the photodetector.*

*33. The method of claims 32, further comprising sampling the photodetector by passing a voltage to the signal line that is indicative of the integrated voltage of the photodetector.*

*34. An imaging device, comprising:*

*a pixel element configured to have a reset, wherein the pixel element includes a photodetector coupled to a reset switch, and wherein the reset switch is configured to receive a reset signal and apply a reset voltage to the photodetector;*

*a signal line configured to be selectively accessed by the pixel element and a plurality of other pixel elements; and*

*a precharge circuit configured to be selectively coupled to the signal line to provide a precharge voltage to the signal line prior to application of the reset voltage to the photodetector.*

*35. The device of claim 34, wherein the pixel is adapted to have a reset and integration operating cycle.*

*36. The device of claim 34, wherein the pixel is adapted to have a reset and sampling operating cycle.*

*37. An imaging device comprising:*

*an array of pixels arranged in rows and columns and adapted to have a reset;*

*column signal lines adapted to be selectively accessed by the rows of pixels; and*

*a precharge circuit adapted to place a voltage on the column signal lines prior to the resetting of each row of pixels.*

*38. An apparatus for placing a voltage on signal lines of an imaging device having an array of pixels arranged in rows and columns, wherein the rows of pixels have a reset, and wherein the signal lines are configured to be selectively accessed by the columns of pixels, the apparatus comprising:*

*switch means configured to be connected to a voltage supply means for connection to the signal lines; and*

*means for controlling the switch means to connect the voltage supply means to the signal lines prior to the reset.*

*39. The apparatus of claim 38, wherein the rows of pixels have a reset and integration operating cycle.*

*40. The apparatus of claim 38, wherein the rows of pixels have a reset and sampling operating cycle.*

* * * * *